(12) United States Patent
Hill

(10) Patent No.: US 8,311,857 B2
(45) Date of Patent: Nov. 13, 2012

(54) SYSTEMS AND METHODS FOR PREVENTING FRAUD

(76) Inventor: Vincent Ellis Hill, Jenkintown, PA (US)

(\*) Notice: Subject to any disclaimer, the term of this patent is extended or adjusted under 35 U.S.C. 154(b) by 0 days.

(21) Appl. No.: 12/978,434

(22) Filed: Dec. 24, 2010

(65) Prior Publication Data

US 2012/0166227 A1    Jun. 28, 2012

(51) Int. Cl.
*G06Q 40/00* (2012.01)
(52) U.S. Cl. .......................................................... 705/4
(58) Field of Classification Search ................. 705/4
See application file for complete search history.

(56) References Cited

U.S. PATENT DOCUMENTS

| | | | |
|---|---|---|---|
| 5,651,117 A * | 7/1997 | Arbuckle | 705/4 |
| 2002/0072925 A1 | 6/2002 | Krim | |
| 2002/0111946 A1 | 8/2002 | Fallon | |
| 2003/0236685 A1 | 12/2003 | Buckner et al. | |
| 2005/0097051 A1* | 5/2005 | Madill et al. | 705/50 |
| 2006/0167716 A1 | 7/2006 | Graham, Jr. et al. | |
| 2007/0038483 A1 | 2/2007 | Wood | |
| 2009/0265382 A1 | 10/2009 | Freiman et al. | |

FOREIGN PATENT DOCUMENTS

JP   2002-032495   1/2002

OTHER PUBLICATIONS

Susanne Sclafane. (Dec. 1998). Anti-fraud work starts with policy design. National Underwriter, 102(49), 6,24. Retrieved Jun. 19, 2012.*
Death Audit Reporting Service. https://www.smworldsolutions.com/Briefs/DeathAuditService.pdf (accessed Jul. 9, 2010).
Testimony of Daniel R. Levinson, The US Senate Committee on Finance, Mar. 2, 2011.
US Senate, Permanent Subcommittee on Investigations, Medicare vulnerabilities: Payments for Claims Tied to Deceased Doctors, Jul. 9, 2008.

\* cited by examiner

*Primary Examiner* — Kito R Robinson
(74) *Attorney, Agent, or Firm* — Berenato & White, LLC

(57) ABSTRACT

A system for preventing fraud is disclosed as is a method of performing the same. Information is received by the system and a database is created containing personal information of deceased individuals. The system then interacts with a billing system to prevent the information of a deceased individual present in the database from being used to submit a false claim.

25 Claims, 6 Drawing Sheets

FIGURE 3

SYSTEMS AND METHODS FOR PREVENTING FRAUD

FIELD OF THE INVENTION

The present invention is directed to systems and methods for fighting fraud, for example, systems for fighting fraud related to Medicare and Medicaid.

BACKGROUND

Medical fraud, specifically fraud related to Medicare and Medicaid, is prevalent in the United States, costing the government tens of billions of dollars a year. Though medical fraud is practiced on a wide scale, only a fraction of the criminals involved are ever apprehended, and out of those that are caught, only a fraction of the stolen money is ever recovered.

One major source of medical fraud is the use of deceased person's medical information to file false claims. This type of fraud has two major branches, one where the deceased is a patient and the other where the deceased is a medical physician. When a criminal impersonates a patient, the criminal typically files false claims relating to medical bills, such as doctor's visits and prescriptions, and is reimbursed by the government. When a criminal impersonates a physician or other healthcare provider, the criminal files false claims relating to services preformed. Currently, insufficient procedures and monitoring are in place to verify the information on these forms before payment is issued.

The government utilizes the Social Security Administration to keep track of deceased individuals in what is termed the Death Master File (DMF). Deaths, however, often go unreported, and absence of a person's name in the DMF is in no way an indication that a person is still alive. No law requires a death to be reported to the Social Security Administration, and family members of the deceased often do not know that deaths should be reported or do not understand the procedures required to do so, especially if the decedent was not of age to receive Social Security benefits. Even if a death is reported, it takes a long time to enter the DMF.

A majority of the government's efforts to fight fraud are based on catching and prosecuting criminals after the fact. These efforts are both inefficient and ineffective at recovering money that is already stolen. By the time criminals are caught, the money is often hidden or spent. Thus, there remains a need to prevent such crimes before they occur.

SUMMARY

In an exemplary embodiment, the present invention is directed to a system of preventing fraud. The system includes an information receiving unit, a database, and a communication unit. The information receiving unit receives notifications of the death of an individual. The report includes personal information relating to the individual. The database stores records of the deceased individual. The communication unit communicates with a billing system and permits correlation of fraudulent claims to the records of the deceased individuals stored in the database.

In another exemplary embodiment, the present invention is directed to a method of preventing fraud. Information related to a deceased individual is received and the information is stored in a database to form a death index. The database and a billing system interact with one another to determine information being entered into the billing system. Information entered into the billing system is analyzed and compared with information present in the database. The billing system is then prevented from issuing a payment for a claim on a deceased individual.

BRIEF DESCRIPTION OF THE DRAWINGS

FIG. 3 is an exemplary form.

DETAILED DESCRIPTION OF EXEMPLARY EMBODIMENT(S) AND EXEMPLARY METHOD(S)

Figure 1:
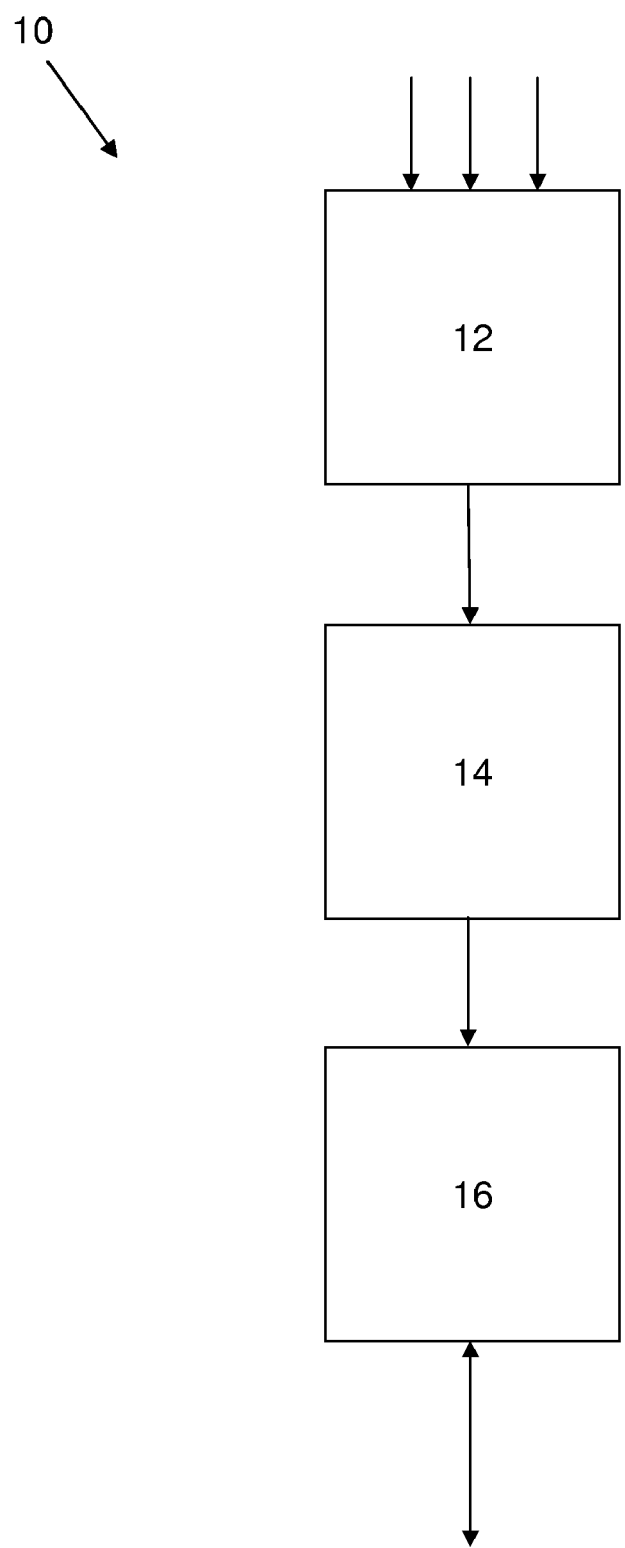
FIG. 1 is a flowchart overview of an exemplary system.

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

Exemplary embodiments are directed to systems and methods of preventing fraud related to Medicare and Medicaid billing. These programs are handled by the Centers for Medicare and Medicaid Services (CMS), a component of the Department of Health and Human Services (HHS). In the interest of brevity, Medicare and Medicaid will be hereinafter referred to as MS. It should be understood, however, that the systems and methods described herein may be adopted by or applied to private health care and life insurance companies.

In an exemplary embodiment, the systems and methods operate to prevent fraud based on the use of a decedent's personal information, especially information that is unique to a specific individual, such as a Social Security Number (SSN). The system can prevent the fraudulent use of a deceased patient's information and the medical identification of a deceased health care provider.

In an exemplary embodiment shown in FIG. 1, a system generally designated by reference numeral 10 comprises a computer system, software system, internet based applications, a network of computer systems, such as a cloud computing network, or any combination thereof. The system 10 will be described in general terms, without in depth discussion of specific hardware and software components that may be incorporated into the system 10. One of ordinary skill in the art will recognize that there are many possible computer system designs suitable for use with these exemplary embodiments, and that various additions or modifications of such systems may be made.

The exemplary system 10 of FIG. 1 includes an information receiving unit 12. The information receiving unit 12 is designed to receive information from a variety of outside sources, the examples of which are described below. The information receiving unit 12 may receive information electronically, for example through an electronic document, form, or other file. The information may be submitted by email, web form, or other electronic transfer. Alternatively, the information may be entered locally using an input or storage device, such as a keyboard, mouse, compact disc, hard disk, or flash drive. The information receiving unit 12 may actively and/or passively obtain information from an outside source. As such, the information receiving unit 12 may be designed not only to receive information but to search, analyze, compile, and alter information.

The information receiving unit 12 is in communication with a central database 14 for forming a death index. The database 14 may be a centralized server or a network of devices, though any known procedure for storing and indexing data may be used. The database 14 may store information received or it may process the information and pass on specific communications to an outside source without storing it. The system 10 may contain appropriate software and hardware for analyzing, organizing, and otherwise manipulating and transmitting the records in the database 14.

The system 10 further includes a communication unit 16 for retrieving information from the database 14 and transmitting the information to a variety of sources. The communication unit 16 may include a communications interface for communicating with these sources in any known fashion, such as a direct electronic connection, a direct network connection, a LAN connection, modem connection, etc. The communications unit 16 may also be designed to interact with or manipulate outside systems, as will be discussed in further detail below. It should be noted that information receiving unit 12, the database 14, and the communication unit 16 are discussed as individual components for the sake of clarity. These units, however, may be the part of a single unit or.

Figure 2:
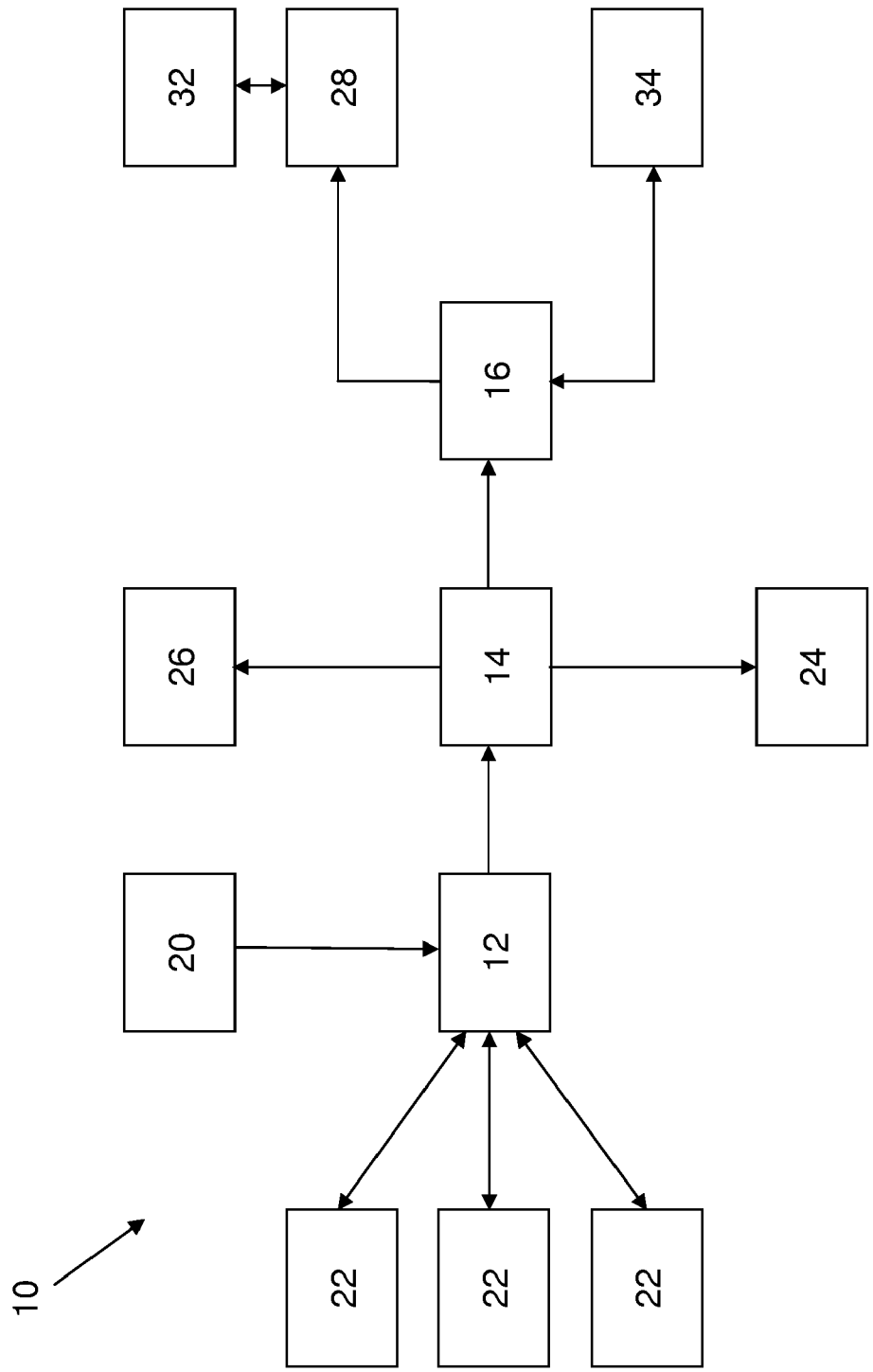
FIG. 2 is a flowchart of an exemplary system.

As best shown in FIG. 2, the system 10 may receive information from a variety of sources. For example, the information receiving unit 12 may receive information from a form 20 filled out by one or more individuals. The form 20 may be filled out and submitted electronically by an individual. In an exemplary embodiment, software containing one or more types of forms 20 is provided and can be installed at individual locations. The form 20 may additionally be a web form which is filled out and submitted electronically by an individual on a website. In an alternative embodiment, the form 20 may be filled out, either by hand or electronically, and then physically submitted to a central location. The form 20 may then be entered into the database 14 either manually or through the use of an optical scanner or image recognition program.

Figure 3:
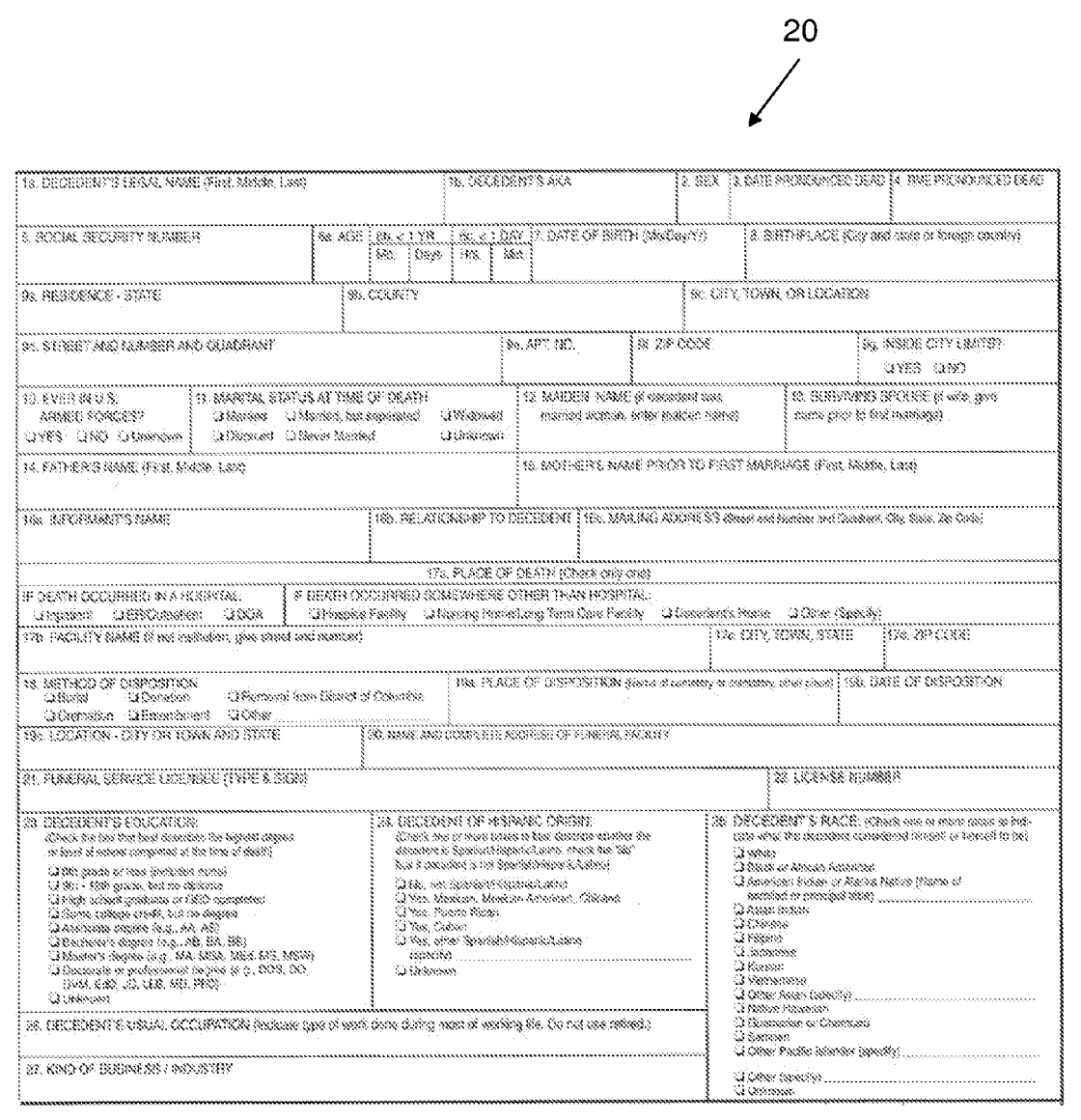

FIG. 3 shows an exemplary form 20. The form 20 has a number of categories relating to personal information of the deceased, such as name, sex, SSN, age, residence, birth date, address, etc. Alternative forms may be used, and the categories may vary from those found in the form 20 shown in FIG. 3. For example, the form 20 may provide additional fields representing a medical identification number, insurance identification number, and, in the case where the decedent is a health care provider, a physician identification number. The form 20 provides more information than is typically stored in death databases, for instance, the DMF. The more detailed form 20 allows for greater accuracy in the death index database 14. In an exemplary embodiment, the form 20 either includes or is accompanied by a picture of the deceased individual. The submitted picture may the most recent photo of the deceased prior to death and/or a photo of the deceased after death. This information is used to prevent fraudulent claims, as discussed in greater detail below.

Upon receipt by the information receiving unit 12, the form 20 is checked for completeness. This check may be performed by the information receiving unit 12 or by another component of the system 10. If the form 20 is incomplete, an error message or other notification may be sent to the source of the form 20 by the communication unit 16. The form 20 may indicate that all known information has been submitted, either on an initial or secondary submission, and be entered into the database 14 as is.

The form 20 may be completed by a funeral director, a relative, a government official, a medical examiner, or other qualified individual. In various exemplary embodiments, funeral directors are the sole source of information for updating the database 14. Designating a funeral director as the outside source for submission of the form 20 is particularly useful because funeral directors are involved in some capacity in almost all deaths occurring in the United States. Other sources, such as newspaper obituaries, are not reliable because they do not always contain every death, and even then the information is incomplete and subject to error. Family members, if there are any, are often in a state of grief, and cannot be relied upon to submit information. Government officials are not always in the position to be notified of every death, and may not know complete information about the individual. A funeral director, however, must be involved with the disposal of a body, be it through cremation or burial, for almost every death in the country. Additionally, funeral directors often have close personal contact with family members, making them available to find out information on the decedent. By utilizing funeral directors, the database 14 can obtain the most accurate and up-to-date information as quickly as possible.

Funeral directors may be motivated to provide submissions to the database 14 for a variety of reasons. They can be offered financial incentives or include a fee for preparing the submission as a service charge, either in addition to or as a part of a predetermined package. Additionally, funeral directors may be motivated to provide submissions in order to comply with the Red Flags Rule. The Red Flags Rule was implemented by the Federal Trade Commission and requires many businesses and organizations to create and implement a written identity theft prevention program designed to detect the warning signs, or "red flags," of identity theft in day-to-day operations. The Red Flags Rule requires businesses to develop a four step procedure which: 1) identifies possible sources of identity theft that may arise in their everyday business practices; 2) takes steps to detect the identity theft established in Step 1; 3) sets forth actions that will be taken when identity theft is detected; and 4) addresses how the program will be reevaluated and updated on a regular basis. By submitting information to the present system 10, funeral directors can easily satisfy all the requirements of the Red Flags Rule.

In addition to the form 20, the information receiving unit 12 may acquire information from external databases 22 to be used as a secondary source of information. The external databases 22 may include the DMF, the Center for Disease Control National Death Index, and vital records maintained by states. The information receiving unit 12 may acquire information from the external databases 22 automatically, for example by searching online, or the information may be obtained through manual searching and entered into the information receiving unit 12. The external databases 22 should be searched on a periodic basis. In an exemplary embodiment, the system 10 has a relationship with one or more external databases 22, so that whenever an external database 22 is updated, a signal or communication is sent to the information receiving unit 12 providing the new data. It should be understood that while forms 20 and databases 22 are discussed herein and shown in FIG. 2 as potential outside sources, the system 10 may contain additional or alternative outside sources.

Upon receipt of information, the information receiving unit 12 creates a record and submits it to the database 14. The information receiving unit 12 may also format the received information in a predetermined manner, so that the information can be quickly and efficiently compiled by the database 14. For example, the information receiving unit 12 may read the information supplied to it, and convert all the information into binary format to be stored in memory by the database 14.

Upon receiving a submission, the database 14 checks for conflicting or repetitive information. Repetitive information may represent information received from an external database 22 that was already submitted by a form 20. If repetitive information is found, it is ignored and not reentered into the database 14. Conflicting information may represent a new entry that shares some of the same personal information with and older entry. If conflicting information is found, an alert unit 24 creates an alert which is reviewed by an administrator. Conflicting information may commonly appear in relation to the decedent's name. This represents little or no concern in preventing fraud; however this information may still be flagged and checked by an administrator for the sake of thoroughness. Conflicting information relating to personal information that is unique to the individual, such as a decedent's SSN, medical identification number, insurance identification number, and, in the case where the decedent is a health care provider, a physician identification number, may represents a serious fraud threat, and should be checked by an administrator. In an exemplary embodiment, the alert unit 24 is capable of creating at least two distinct types of alerts. The first type of alert represents low priority conflicting information, such as a person's name, while the second type of alert represents high priority conflicting information, such as a conflicting SSN. In an exemplary embodiment, an administrator is able to access the system 10 remotely, such as through a personal computer or smart phone, which connects to the system 10, through a network or through virtualization software. The alerts are preferably stored in the system 10 by the alert unit 24 until cleared by an administrator.

After the data has been converted and passes any conflict checks, the database 14 may perform a variety of operations. For example, the database 14 may store the record created by the information receiving unit 12 in a memory unit 26. The memory unit 26 may consist of a single centralized server or a network of devices. Various components which make up the memory unit 26, including different hardware and software components, will be understood by one of ordinary skill in the art.

After the database 14 is updated, the communication unit 16 may retrieve the records from the database 14. In an exemplary embodiment, the communications unit 16 provides an output to a billing system 28. This billing system 28 may be associated with MS billing operations, with a doctor's office, or with other health care provider billing operations. Typically, the CMS contracts with a private company to handle claim billings. The contractors may also be in charge of investigating fraud, thus encouraging them to utilize or communicate with the present system 10. In an exemplary embodiment, the database 14 is able to receive information about a deceased person and communicate this information directly to a billing system 28 through communication unit 16. As shown in FIG. 3, part of the information received by the database 14 relates to the decedent's occupation. In an exemplary embodiment, when this information is received by the database 14, it checks to see if the decedent's occupation was a physician or other health care provider. If so, the communication unit 16 sends this information to the billing system 28. This communication also prevents billing for services performed by the deceased physician. The communication may take place through a suitable telecommunication system, such as an electronic, optical, or satellite communication system. In an exemplary embodiment, the system 10 automatically prevents the entering of billing information related to a deceased person. This may be accomplished directly by the system 10 or by the billing system 28 as a result of the communication, as discussed in greater detail below.

Figure 4:
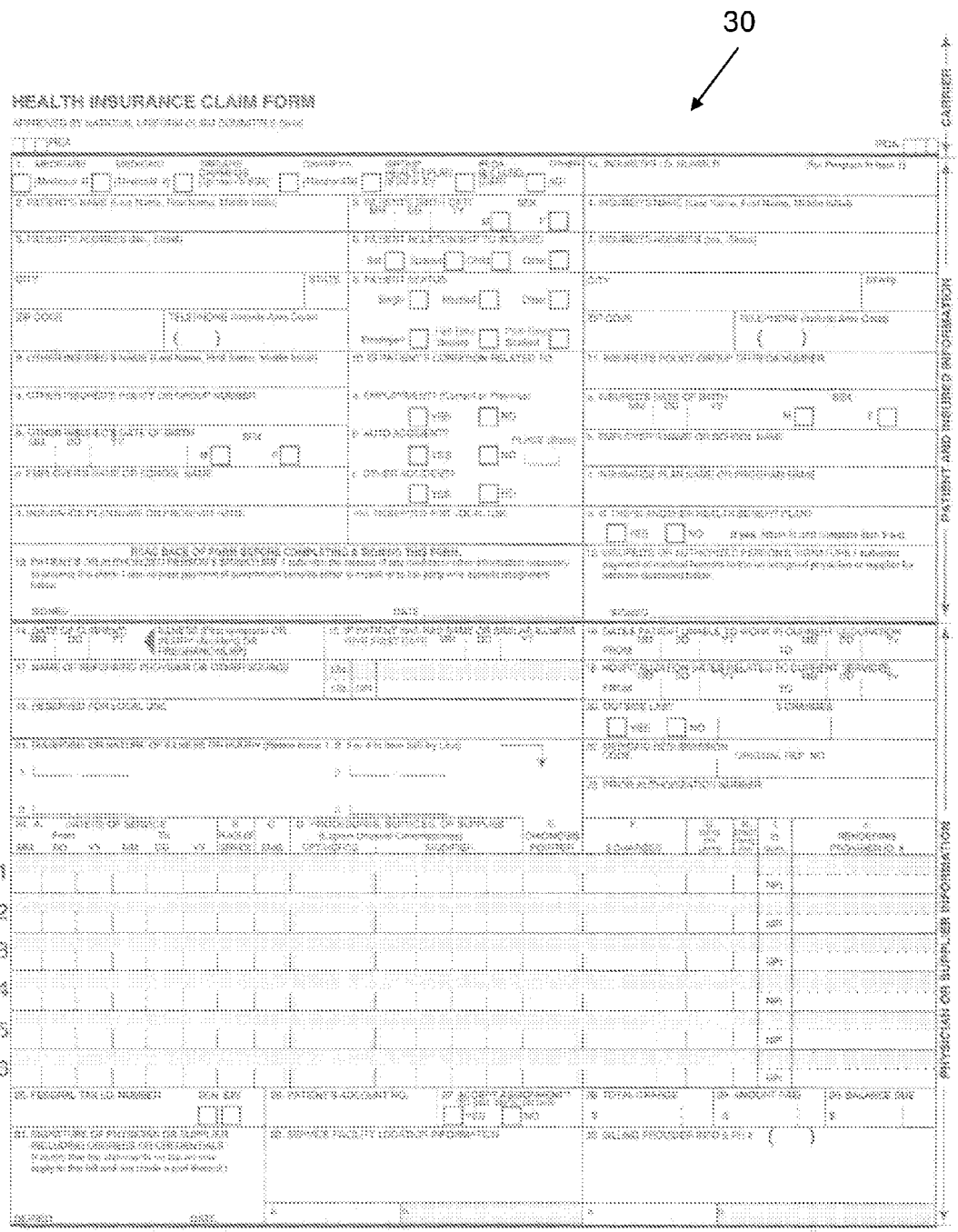
FIG. 4 is an exemplary billing form.
Figure 5:
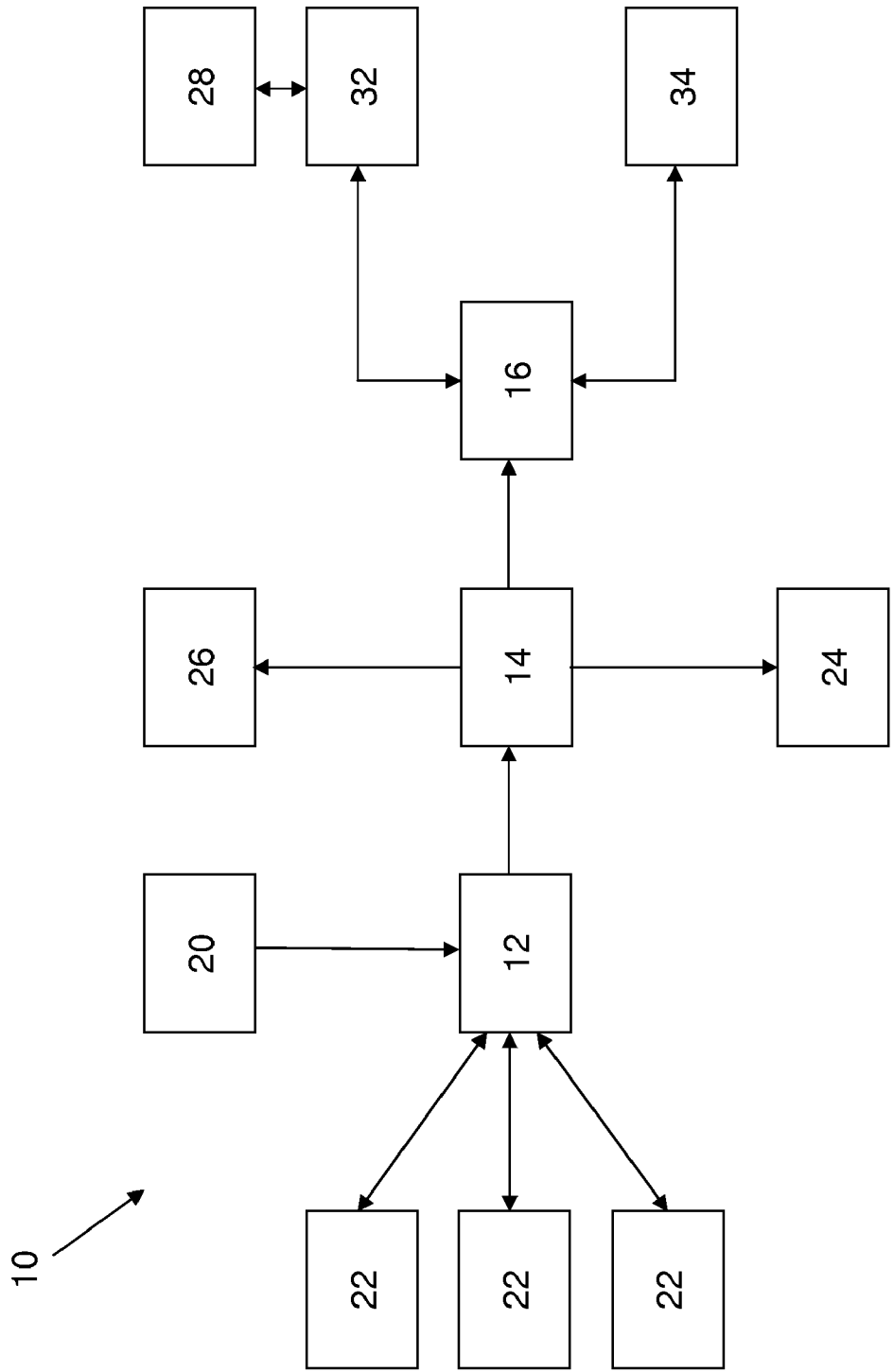
FIG. 5 is a flowchart of an exemplary system.

FIG. 4 shows an exemplary medical billing form 30. Preventing a deceased person's billing information may be done by blacking out, fading, or otherwise making it impossible to enter information into the billing form 30 when it is determined that a decedent's social security number, patient id number, or other type of identification number is being used. In an exemplary embodiment, the communication unit 16 sends a communication to a billing system 28 indicating that a person is deceased. The billing system 28 then stores this information. An analyzing unit 32 then analyzes or otherwise monitors information stored in the billing system 28 or entered into a billing form 30. As shown in FIG. 5, alternatively, or in addition to monitoring by the billing system 28, the communication unit 16 communicates directly with the analyzing unit 32, which monitors the billing system 28.

The analyzing unit 32 may utilize keystroke recognition and logging, as well as or in addition to form monitoring to analyze information input to the billing form 30. Known techniques, such as utilizing scripting or program languages, for example Javascript, can be used by the analyzing unit 32 to implement scanning and monitoring of the billing form 30. The billing form 30 may be present in a machine readable electronic format, for example having extensible markup language (XML), such as an Xform, or interactive PDF. The billing form 30 may also be present in a web-based application having hyper text markup language. These types of documents typically have tags associated with specific fields. The analyzing unit 32 monitors the individual tagged fields by scanning the source code of the billing form 30. The information present or entered into each field is then compared with the information received from the communication unit 16 or information that is present in the database 14. For example, the analyzing unit 32 monitors a field tagged as containing a SSN, insurance number, or other patient identification number. As shown in FIG. 4, the second part of the billing form 30 addresses physician or supplier information. As with the patient information, the system may monitor information submitted on this section of the billing form 30 and determine if a deceased physician's identity is being used.

In addition to monitoring the information as it is being entered, the analyzing unit 32 may decode and determine the content of the field after the information has been completely entered. This may be accomplished either upon submission of the entire billing form 30 or upon the determination that a field has been completed. The analyzing unit 32 may conclude that a particular field has been completed by determining information is being entered into a different field or by determining the position of a text entry cursor. Additionally, the electronic form may have field information which indicates that a specific number of characters should be entered into the field. The analyzing unit 32 may determine when this number is reached and begin comparing the information inputted to the billing form 30 with the information retrieved from the database 14.

The analyzing unit 32 may analyze every field, or it may be designed to analyze certain fields identified by specific tags. For example, certain fields, such as a patient or health care provider's identification number, are given a higher weight or priority. If only a part of the billing form 30 is being actively monitored, and information relating to a deceased person is found in these fields, a complete check of the billing form 30 may then be performed either manually or by the system.

The analyzing unit 32 may also analyze forms not in an XML format. For example, if a hardcopy of the billing form 30 is submitted, the analyzing unit 32 may scan the form to analyze the information, such as through optical character recognition. Forms may also be present on electronic paper and input provided via an electronic stylus. This information may be received by the billing system 28 and decoded by the analyzing unit 32. Other electronic and non-electronic forms that are known in the art can be analyzed by the analyzing unit 32 using an appropriate method as will be understood by those of ordinary skill in the art.

As discussed above, various exemplary embodiments incorporate the submission of a photograph to the information receiving unit 12. Though the billing form 30 does not require a photograph, the submission of such could be mandated for both a patient and a physician. The analyzing unit 32 may then analyze the photograph, for example, by using image recognition, to compare the picture accompanying the billing form 30 with those present in the database 14. This may be done as a secondary check, when some conflicting information is found, or it may be done for all submissions.

If the analyzing unit 32 determines that information of a deceased person has been entered, the billing form 30 is flagged and payment of the bill is prevented. The billing system 28 or contractor is also notified of the presence of fraudulent information. Payment may be prevented in a variety of manners, such as preventing information from being entered into the billing form 30, preventing the submission of the billing form 30, or by interacting with the billing system 28 to prevent the acceptance of the billing form 30. It should be understood that preventing payment may depend in part on the make up of the billing system 28. Accordingly, various procedures and the components for implementing payment prevention will be understood by those of ordinary skill in the art upon viewing the disclosure set forth herein.

In addition to preventing payment, the analyzing unit 32 may send an alert to any individual designated by the billing system 28. An alert may also be sent to an administrator of the system 10 so that a follow up may be made to determine the notice was received and heeded. In an exemplary embodiment, an alert may also be sent to authorities to inform them of potential fraud. Either the system 10 or the billing system 28 may capable of tracking the location of submissions and provide data on the submitting entity along with the alert of fraud and evidence of the fraudulent information to the authorities.

In an exemplary embodiment, the communication unit 16 may have a secondary output 34. This output may inform other entities of an individual's death. These entities may include one or more financial institutions, such as banks, credit cards, lending institutions, trusts, etc. Additionally, the family of the decedent may specify entities they wish to have notified. This may be done either through the funeral director, who can submits such data with the death information, or family members may directly access the system 10 to input this information. The system 10 may also be capable of receiving a request for information from outside entities.

Figure 6:
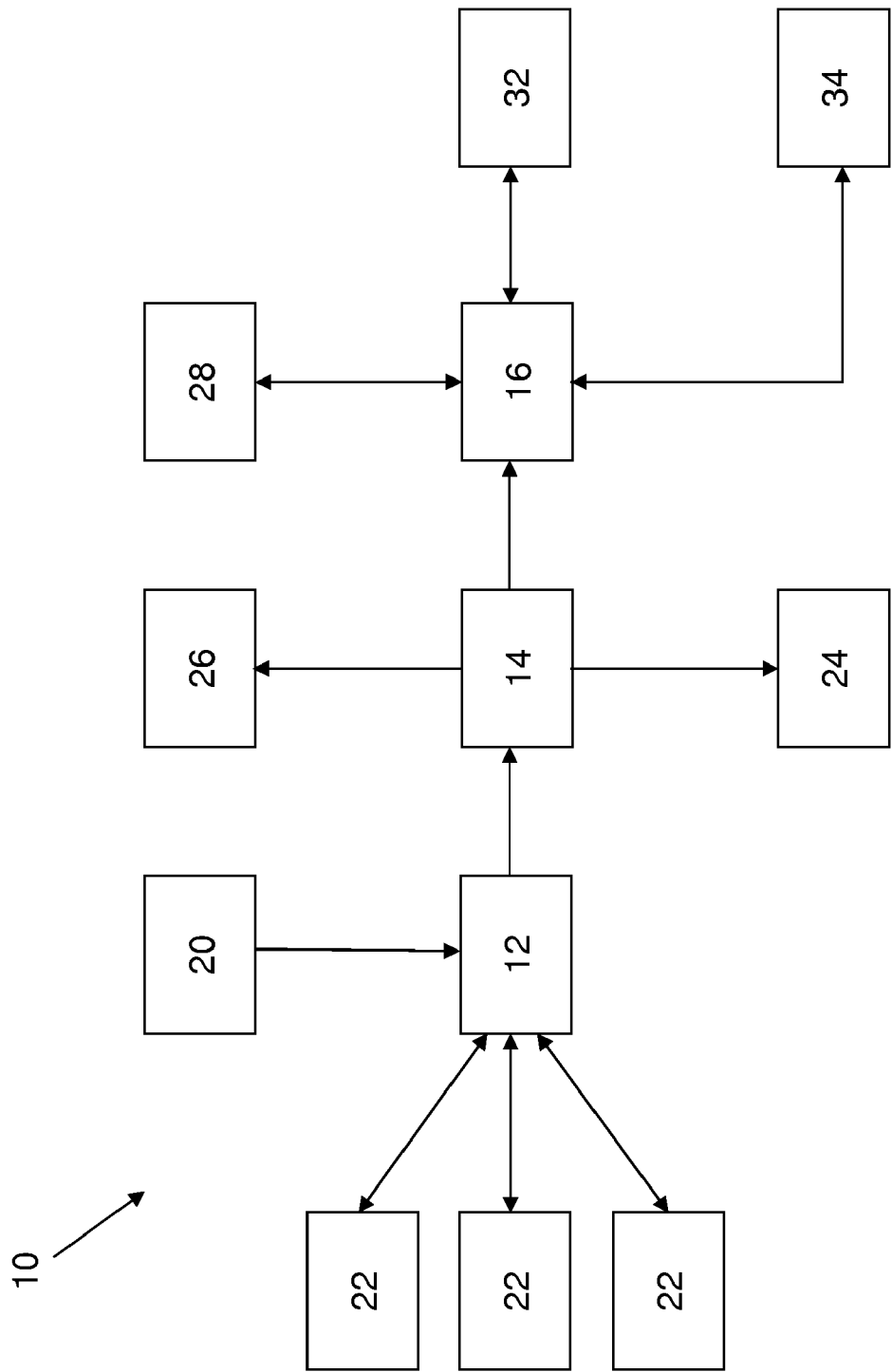
FIG. 6 is a flowchart of an exemplary system.

FIG. 6 shows an exemplary embodiment where the billing system 28 initiates communication with the system. Before paying a submitted bill 30, the billing system 28 sends a communication to the communication unit 16. This communication includes the information submitted in the billing form 30. The information is analyzed by the analyzing unit 32 as discussed above. The analyzing unit determines if either the patient or the health care provider is deceased. If there is no fraudulent information present in the billing form 30, the analyzing unit 32 determines it is ok to pay the bill, and the communication unit 16 sends a signal back to the billing system 28. If the analyzing unit 32 determines that a deceased individuals information is being used, it instructs the communication unit 16 to send an alert to the billing system 28 indicating the presence of fraud and preventing payment of the bill 30.

While the billing system 28 has been described as an external entity, various exemplary embodiments may include the billing system 28 within the present system 10 as a single inclusive system. Additionally, while an exemplary computer system has been discussed, various exemplary embodiments are contemplated which comprise software containing instructions stored thereon which, when executed by a computer, cause the computer to perform some or all of the functions and tasks described above. The above described exemplary systems and processes are designed to fight fraud related to medical billing by utilizing real-time blocking of fraudulent claim forms. The system 10 may be completely automated and instantly update after receiving the notice of a death. This provides a great advantage over other databases, such as those run by government entities, which update periodically, such as every year or 15 months, because any amount of elapsed time provides criminals with an opportunity to steal greater sums of money.

The foregoing detailed description of the certain exemplary embodiments has been provided for the purpose of explaining the principles of the invention and its practical application, thereby enabling others skilled in the art to understand the invention for various embodiments and with various modifications as are suited to the particular use contemplated. This description is not necessarily intended to be exhaustive or to limit the invention to the precise embodiments disclosed. Additional embodiments are possible and are intended to be encompassed within this specification and the scope of the appended claims. The specification describes specific examples to accomplish a more general goal that may be accomplished in another way.

Only those claims which use the words "means for" are to be interpreted under 35 U.S.C. 112, sixth paragraph.

What is claimed:

1. A computer-implemented system for preventing payment of fraudulent claims comprising:
   an information receiving unit for receiving notifications of the death of an individual, the notification comprising information relating to the occupation of the individual;
   a database for storing records corresponding to the deceased individuals, each record containing personal information that is unique to or otherwise allows for the identification of the corresponding deceased individual; and
   a communication unit for communicating with a billing system, wherein the communication unit permits correlation of fraudulent claims to the records of the deceased individuals stored in the database, wherein the system is operable to determine that the occupation of the individual is a health care provider, and the communication unit is operable to prevent the payment of a claim for services provided by the deceased healthcare provider.

2. The system of claim 1, wherein the information receiving unit generates the records, and the database is automatically updated each time a record is generated.

3. The system of claim 1, wherein the system is operable to generate an alert when information on a claim relates to information contained in the database on a deceased individual.

4. The system of claim 1, further comprising an analyzing unit operable to compare information submitted to the billing system with information in the database.

5. A system for preventing fraud comprising:
an information receiving unit for receiving notifications of the death of an individual, the notification comprising information relating to the occupation of the individual;
a database for storing records corresponding to the deceased individuals, each record containing personal information that is unique to or otherwise allows for the identification of the corresponding deceased individual; and
a communication unit for relaying information between the database and a billing system; and
an analyzing unit for analyzing information entered into a billing system, said analyzing unit operable to determine that the occupation of the individual is a health care provider and operable to determine if information on a billing form is related to information present in the database.

6. The system of claim 5, wherein the communication unit is operable to receive information relating to a billing claim from a billing system and passes the received information to the analyzing unit for determining if the received information relates to information stored in the database.

7. The system of claim 6, wherein the communication unit is operable to send a communication to a billing system instructing it whether to pay a bill or not.

8. The system of claim 6, wherein the communication unit is operable to generate an alert when the analyzing unit determines information on a billing form is related to information on an individual in the database.

9. The system of claim 5, wherein the communication unit is operable to relay information relating to the deceased individual to the analyzing unit.

10. The system of claim 5, wherein the analyzing unit is operable to actively monitor information entered into a billing system to correlate information relating to an entry in the database with entries into the billing system.

11. The system of claim 10, wherein the system is operable to generate an event in the billing system when the analyzing unit determines information relating to an entry in the database is being entered into a billing form.

12. The system of claim 11, wherein the event causes a portion of the billing form to become inaccessible.

13. A method of fighting fraud comprising:
receiving information relating to a deceased individual, wherein the information comprising information relating to the occupation of the individual;
storing the received information in a database to form a death index;
interacting with a billing system to determine information being entered into the billing system;
comparing the information entered into the billing with information present in the database with an analyzing unit comprising a processor; wherein analyzing comprises determining that the occupation of the individual is a health care provider and
preventing the billing system from issuing a payment for a claim on a deceased individual.

14. The method of claim 13, wherein said step of interacting with a billing system is performed by a communication unit which receives information from the billing system.

15. The method of claim 14, wherein the billing system transmits a billing form to the communication unit to be analyzed.

16. The method of claim 13, wherein said step of interacting with a billing system is performed by an analyzing unit which actively monitors information entered into the billing system.

17. The method of claim 16, wherein the analyzing unit utilizes key stroke recognition to monitor the information entered into at least one data field of the billing system.

18. The method of claim 13, further comprising the step of creating an alert when said step of analyzing the information determines information relating to an entry in the database is being entered into a billing form.

19. A computer-implemented system for preventing payment of fraudulent claims comprising:
an information receiving unit for receiving notifications of the death of an individual, the notification comprises information relating to the occupation of the individual;
a database for storing records corresponding to the deceased individuals, each record containing personal information that is unique to or otherwise allows for the identification of the corresponding deceased individual;
a communication unit for communicating with a billing system; and
an analyzing unit operable to actively monitor information entered into a billing system and comparing the information entered into a billing system with information stored in the database, wherein the analyzing unit is operable to determine that the occupation of the individual is a health care provider, and the communication unit is operable to prevent the payment of a claim for services provided by a deceased healthcare provider.

20. The system of claim 19, wherein the analyzing unit is operable to monitor data entered into fields of a billing form.

21. The system of claim 20, wherein the communication unit is operable to relay information relating to the deceased individual to the analyzing unit.

22. The system of claim 19, wherein the system is operable to cause a portion of the billing form to become inaccessible.

23. The system of claim 19, wherein the communication unit is operable to prevent the payment of a claim for services received by a deceased individual.

24. The system of claim 19, wherein the system is operable to generate an event in the billing system when the analyzing unit determines information relating to an entry in the database is being entered into a billing form.

25. The system of claim 19, wherein the communication unit is operable to generate an alert when the analyzing unit determines information on a billing form is related to information on an individual in the database.

* * * * *